2,911,059

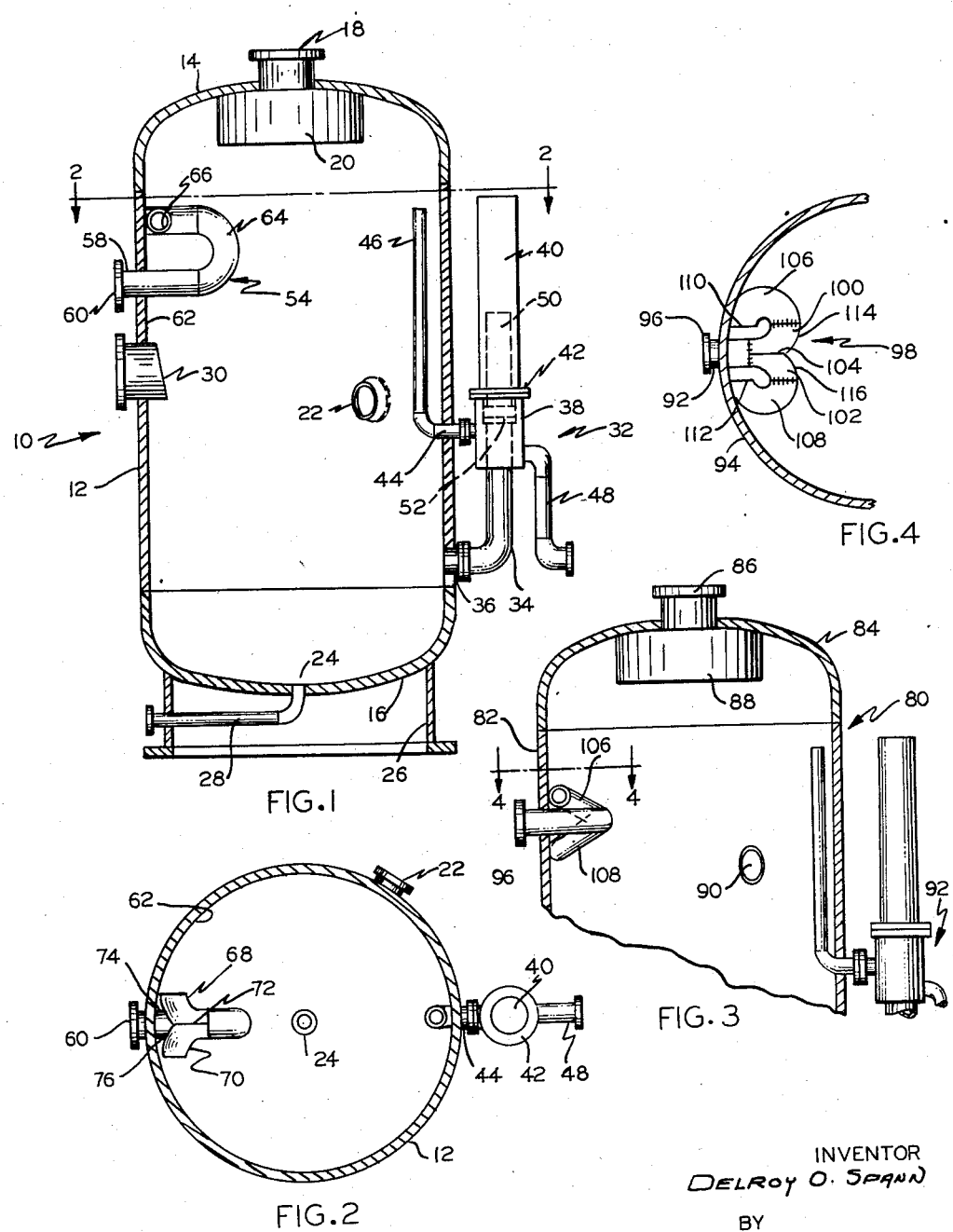
Nov. 3, 1959  D. O. SPANN  2,911,059
SPLIT STREAM INLETS
Filed Feb. 25, 1957  2 Sheets-Sheet 1
INVENTOR
DELROY O. SPANN
BY
ATTORNEYS United States Patent Office 2,911,059
Patented Nov. 3, 1959

SPLIT STREAM INLETS

Delroy O. Spann, Baton Rouge, La., assignor to Delta Tank Manufacturing Co., Inc., Baton Rouge, La., a corporation of Louisiana Application February 25, 1957, Serial No. 642,287

9 Claims. (Cl. 183—2.7)

This invention relates to process vessels and more particularly to process vessels having an improved type of stream inlets.

In oil field operations and in the chemical industry in general various types of process vessels are used to perform various functions, such as separation of oil, water and gas, emulsion treatment, etc. Most of these vessels are generally cylindrical in shape and many are vertically mounted with the stream to be treated introduced into the upper portion thereof. Considering, for ease of illustration, a vertical separator used for separating oil, water and gas in oil field operations, it has been conventional to provide a stream inlet for these tanks which either directs the incoming stream against a series of baffles, or directs the stream sideways and generally tangentially in the tank against the internal vertical wall. Both of these types of inlets possess certain advantages and disadvantages and neither presents a completely satisfactory solution to the inlet problem. The baffle type of inlet operates on the principal of breaking up the incoming stream into more or less small droplets to facilitate the rain-like descent of the stream through the tank as the gas rises. The tangential type of inlet, on the other hand, spreads the incoming stream against the internal wall of the tank to secure a fairly large liquid gas interface. In most conventional tangential inlets, however, the stream leaving the inlet is more or less pumped against the internal tank wall so that streamlined flow conditions are not obtained.

According to the present invention it has now been found that a highly efficient and satisfactory inlet arrangement is achieved when the incoming stream is divided and flowed back upon the wall through which it entered in such a manner that centrifugal force urges the liquid smoothly against the wall in two streams directed in opposite directions. These oppositely directed streams flow tangentially onto the tank walls and therearound towards the opposite side of the tank. They enter the pool of liquid at the tank bottom without a tendency to set up a large concentric swirl in the tank. The two streams present twice the liquid gas interface previously obtained and thus achieve a higher efficiency separation at the time that the stream is first flowed into the vessel.

In addition to this, it is a feature of the invention that the incoming stream is directed through a short radius smooth turn of at least 180 degrees and is then flowed onto the internal tank wall through which it entered in a truly tangential manner so as to effect a centrifugal separation at the very inletting of the stream into the vessel. According to one embodiment of the invention the incoming stream passes through the wall of the vessel, is caused to reverse its direction in a small radius turn so as to flow towards the internal wall through which it entered, and is then split into two stream which are tangentially discharged onto this wall. With this arrangement a certain centrifugal separation tends to occur during the first 180 degree turn and further centrifugal separation tends to occur as the stream is split and then caused to flow through further short radius turns so as to be discharged tangentially onto the internal vessel walls. According to another embodiment of the invention the incoming stream is passed through the vessel wall and is then immediately split and flows through smooth turns of approximately 270 degrees to be discharged tangentially onto the internal wall of the vessel. Again a centrifugal separation tends to occur and the two streams are discharged towards one another but laterally spaced so that they flow around the vessel in opposite directions. While these inlets are highly desirable for use in separating vessels they also find application in other process equipment as will be explained more fully hereinafter.

It is accordingly a primary object of the present invention to provide process vessels having improved inlets for introducing streams of fluid into the vessels.

It is another object of the invention to provide process vessels having improved inlets which flow oppositely directed streams onto the internal wall of the vessel through which the stream entered in a tangential manner so that centrifugal force urges the fluid onto the vessel wall.

It is another object of the invention to provide process vessels having improved inlets which flow an entering stream of fluid onto the internal wall of the vessel through which the stream entered in oppositely disposed streams after having subjected the fluid to at least a 180 degree short radius smooth change in direction.

It is another object of the invention to provide improved inlet arrangements for process vessels.

It is another object of the invention to provide an inlet for a process vessel which causes the incoming stream of fluid to split into two streams after it passes through the vessel wall and then changes the direction of each stream approximately 270 degrees to discharge both streams in opposite directions at laterally spaced positions.

It is another object of the invention to provide an inlet for process vessels which reverses the direction of flow of an incoming stream of fluid at least 180 degrees after it has entered the vessel and then splits the stream to discharge tangentially onto the internal tank wall through which it entered.

These and further objects and advantages of the invention will become apparent upon reference to the following specification and claims and appended drawings wherein:

Figure 1 is a vertical section showing a vertical separator tank having an inlet constructed according to one embodiment of the invention;

Figure 2 is a horizontal section taken on the line 2—2 of Figure 1 showing a plan view of the tank and inlet of Figure 1;

Figure 3 is a partial vertical section showing the upper portion of a vertical separator tank having an inlet according to another embodiment of the invention;

Figure 4 is a partial horizontal section taken along the line 4—4 of Figure 3 and showing a plan view of the inlet of Figure 4.

Figure 5:
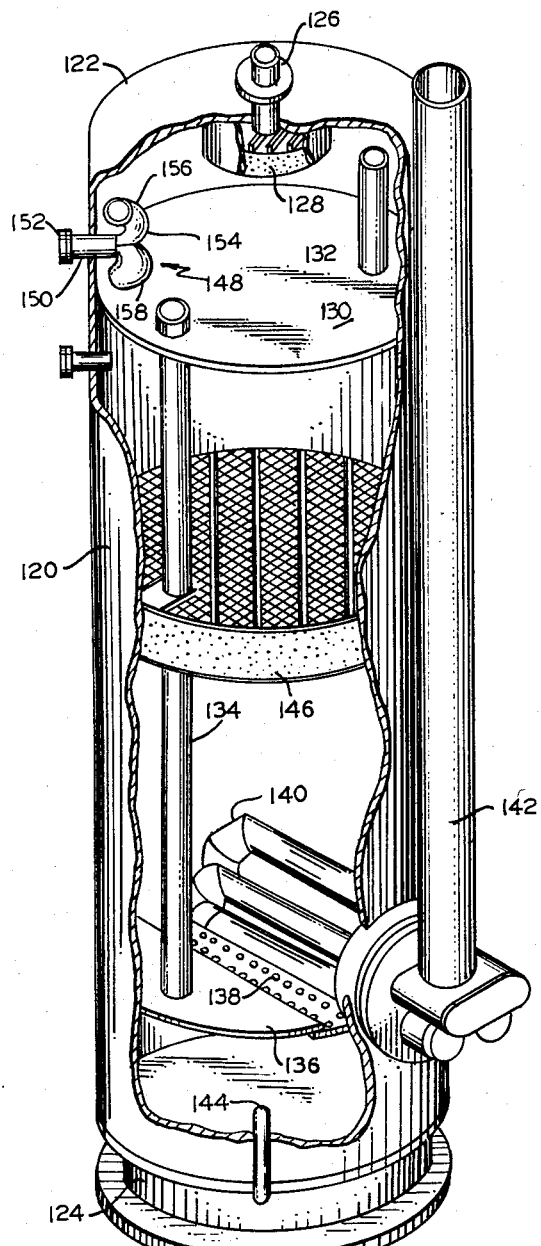
Figure 5 is a perspective view, partly in section, showing an oil field treater tank having an inlet constructed according to one embodiment of the invention.

Referring more particularly to Figures 1 and 2 of the drawings, there is seen a vertical separator generally indicated at 10, which comprises a cylindrical body 12 having domed caps 14 and 16 secured to the top and bottom thereof in any suitable manner, such as by welding. A gas outlet 18 is provided in the top of cap 14 and a mist extractor 20 is mounted therebelow. This mist extractor may be of any suitable type such as, for instance, the type disclosed in assignee's copending application Serial No. 651,540, filed April 8, 1957. An oil outlet 22 is provided in the cylindrical body 12 and a drain 24 is disposed centrally in the bottom cap 16. The unit is mounted upon a conventional skirt 26 and a drain pipe 28 connected to drain 24 passes through this skirt.

A mounting inlet 30 for a liquid level controller is disposed in the side of cylindrical body 12 and an oil-water interface control syphon, shown generally at 32, is mounted on the other side of the vessel. This syphon consists of a water stand pipe 34 connected to the lower portion of the vessel at 36. A receiver 38 is disposed about the upper end of the water stand pipe 34 and has an extension 40 connected thereto by flange 42. The receiver 38 is vented to the gas space in the separator vessel by pipes 44 and 46 and a water outlet 48 is connected to the lower portion thereof. The water stand pipe 34 is provided with a removable extension 50 which is connected thereto by a suitable coupling 52.

As is understood by those skilled in the art, the length of the extension 50, that is the effective length and height of the water stand pipe 34 and extension 50, determines the level of the oil-water interface within the separator vessel, and the level of this interface may be varied by changing the length of the extension 50. Water is removed from the tank through the water outlet 48.

In the upper left hand portion of the cylindrical body 12 there is provided an inlet 54 constructed according to one embodiment of the invention. This inlet comprises a first straight pipe section 58 suitably flanged at 60 and passing through the wall 62 of the cylindrical body 12. Welded to the internal end of pipe 58 is a 180 degree elbow 64 having a relatively short radius. Attached to the upper end of elbow 64 is a stream splitter or diverter 66 which may consist of a pair of 90 degree elbows 68 and 70 which have been cut along the plane 72 and welded together as is described in more detail in assignee's co-pending application Serial No. 635,067, filed January 18, 1957. It will be seen that the elbows 68 and 70 present relatively short radius curved surfaces 74 and 76 along which the stream flows smoothly, which surfaces deliver the two streams to the internal surface of the wall 62 generally tangentially.

Referring to Figure 1, the incoming stream is turned 180 degrees in elbow 64 in a short radius to create a centrifugal separation tendency. The stream is then divided by flow splitter 66 as it flows along curved surfaces 74 and 76 and again subjected to centrifugal force which tends to effect further separation. The two streams smoothly flow onto the interior walls 62 of the cylindrical body 12 to form a pair of opposed flows which tend to encircle the inner surface of the tank. Large liquid gas interfaces are presented and a minimum of splattering occurs as the two streams leave the flow splitter 66. The opposing streams of liquid enter the pool of liquid standing in the tank and by reason of their opposed flows do not tend to create a large concentric swirl in this liquid. The effective radii of the 180 degree elbow 64 and of the 90 degree elbows 68 and 70 should be relatively small to create the desired centrifugal effects and preferably are less than one-third the radius of the vessel.

Referring to Figures 3 and 4 there is shown another embodiment of the invention which is also illustrated in connection with a three phase vertical separator for use in oil field operations. In this embodiment of the invention a vertical separator 80 consists of a cylindrical body portion 82 having a domed cap 84 as in the separator tank shown in Figures 1 and 2. A gas outlet 86 is provided in the top of cap 84 and a suitable mist extractor 88 is mounted therebeneath. An oil outlet is disposed in the body portion 82 at 90 and a syphon arrangement 92 similar to that shown in Figures 1 and 2 may be utilized to provide for control of the level of the water-oil interface.

The inlet to this separator tank consists of a straight pipe section 92 passing through the wall 94 of the tank and having a flanged outer end 96. Attached to the inner end of straight pipe 92 is a flow diverter or splitter 98 which may consist of a pair of 90 degree elbows 100 and 102 cut along the plane 104 and welded together in the manner of the stream splitter illustrated and described in connection with Figures 1 and 2. Attached to the end of elbows 100 and 102 are a pair of 180 degree elbows 106 and 108 having ends 110 and 112 terminating substantially at the tank wall 94. Elbow 106 is inclined upwardly with respect to straight pipe 92, as seen in Figure 3, while elbow 108 is disposed downwardly at an angle to straight pipe 92 as also seen in Figure 3.

In this embodiment of the invention the incoming stream of fluid is split by the flow diverter 98 and is subjected to a centrifugal separation tendency as the stream flows along curved surfaces 114 and 116 of the flow diverter. The two streams then enter the 180 degree elbows 106 and 108 where they are subjected to further centrifugal separation tendencies and are finally directed tangentially onto the inner wall 94 of the separator. While the two streams from elbows 106 and 108 are seemingly directed toward one another in Figure 4, they do not interfere with one another by reason of the upwardly angular displacement of elbow 106 and the downwardly angular displacement of elbow 108 as seen in Figure 3. Rather, the two streams flow in opposite directions around the inner periphery of the tank presenting large gas liquid interfaces and settling in the liquid pool of the bottom of the tank without a tendency to set up a large concentric swirl.

The incoming fluid stream is thus caused to flow through a continuous smooth turn of approximately 270 degrees to create a centrifugal separation tendency, and is then deposited on the internal peripheral wall of the vessel in a smooth flow without any substantial tendency to splashing or turbulence. The radii of the 90 degree elbows and 180 degree elbows are again relatively small and are preferably less than one-third the radius of the vessel.

While the foregoing two embodiments of the invention have been described in connection with separator tanks, it is also contemplated that these inlets may be utilized in other types of process vessels. As an example of such a use, there is shown in Figure 5 a treater vessel for use in the treatment of emulsion in oil field operations. Referring to this figure of the drawing there is shown at 120 a vertical cylindrical tank having a domed top 122 and a skirt 124 supporting the bottom. A gas outlet is provided in the top of the tank at 126 and a mist extractor 128 is mounted therebelow.

A plate 130 is disposed across the top of the tank and receives a pipe 132 which forms the pressure equalizing connection for a syphon of the type shown in the embodiments of the invention described in connection with Figures 1 through 4. An oil, water and mud pipe 134 passes through plate 130 and extends to a lower plate 136 in a manner which will be understood by those skilled in the art. An apertured emulsion distributor plate 138 is provided in the center of plate 136 and a heater 140 is mounted thereover and vented by a flue 142. A drain 144 is provided in the bottom of the tank and a suitable filter section 146 is disposed approximately midway of the tank.

Mounted in the upper portion of the tank is an inlet 148 which may be of the type shown in either Figures 1 and 2 or Figures 3 and 4 and which, for convenience, is shown as a straight pipe 150 flanged at 152 and connected to a flow diverter 154 as in the embodiment of the invention shown in Figures 3 and 4.

The ends of the flow diverter 154 are connected to 180 degree elbows 156 and 158 which terminate substantially adjacent the internal wall of the tank and which are directed angularly upwardly and downwardly as in the embodiment of the invention shown in Figures 3 and 4. It will be apparent to those skilled in the art that the inlets of this invention may be used in still other types of process vessels and it is not intended that these vessels be restricted to oil field operations.

The inlets of the invention create centrifugal separation tendencies as a stream of fluid is introduced into the particular process vessel and is split into a pair of oppositely directed flows. This delivery is accomplished with a minimum of turbulence and the two flows are forced onto the internal peripheral surface of the process vessel by centrifugal force rather than being merely directed at this wall. Large liquid-gas interfaces are provided and the tendency to create a large concentric swirl in the bottom of the tank is eliminated.

While the elbows and turns discussed herein have been referred to as 90 and 180 degree turns it will be understood that this is not meant to be limiting except as those turns and elbows are defined in the appended claims. Deviations from these exact figures may be necessary in order to adapt the inlets to particular process vessels.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by the United States Letters Patent is:

1. A process vessel comprising a tank having a portion thereof whose walls have a substantially circular cross-section, an inlet conduit for introducing fluid into said tank entering the wall of said tank substantially radially at said circular cross section, a flow diverter in said tank connected to said inlet conduit and defining a pair of discharge paths for discharging said fluid tangentially onto the internal surface of the wall of the tank through which said inlet conduit passes and in the area of entrance of said inlet conduit, said flow diverter comprising conduit means smoothly curved from its connection with said inlet conduit to its discharge points at said wall in the area of entrance of said inlet conduit through an angle of no less than approximately 270° so that unreversed centrifugal force is maintained on said fluid substantially constantly from the time it enters said flow diverter in a substantially radial direction until and including the time it flows along said circular wall.

2. A process vessel as set out in claim 1 wherein said flow diverter comprises a first bent conduit connected at one end thereof to said inlet conduit and at the other end thereof to a pair of bent conduits which terminate at said wall.

3. A process vessel as set out in claim 2 wherein said first conduit is curved through approximately 180° and each of said bent conduits is curved through approximately 90°.

4. A process vessel as set out in claim 2 wherein said first bent conduit extends substantially vertically in said process vessel.

5. A process vessel as set out in claim 4 wherein said pair of bent conduits extends substantially horizontally in said process vessel.

6. A process vessel as set out in claim 1 wherein said flow diverter comprises a pair of bent conduits which extend substantially from the connection of said flow diverter to said inlet conduit to said wall of said vessel.

7. A process vessel as set out in claim 6 wherein each of said bent conduits is curved through approximately 270°.

8. A process vessel as set out in claim 7 wherein each of said bent conduits forms substantially three quarters of a circle.

9. A process vessel as set out in claim 8 wherein said conduits in said bent pair of conduits terminate at said wall at different vertical levels.

References Cited in the file of this patent
UNITED STATES PATENTS

| | | |
|---|---|---|
| 265,242 | Chafer | Oct. 3, 1882 |
| 2,642,949 | Tyskewicz | June 23, 1953 |
| 2,782,023 | Weiss | Feb. 19, 1957 |